(12) United States Patent
Tokunaga et al.

(10) Patent No.: US 7,028,568 B2
(45) Date of Patent: Apr. 18, 2006

(54) SENSOR HAVING RESIN MOLD CASING AND METHOD OF MANUFACTURING THE SAME

(75) Inventors: Masatoshi Tokunaga, Chiryu (JP); Yasuaki Makino, Okazaki (JP)

(73) Assignee: Denso Corporation, Kariya (JP)

( * ) Notice: Subject to any disclaimer, the term of this patent is extended or adjusted under 35 U.S.C. 154(b) by 228 days.

(21) Appl. No.: 10/637,563

(22) Filed: Aug. 11, 2003

(65) Prior Publication Data

US 2004/0118227 A1    Jun. 24, 2004

(30) Foreign Application Priority Data

Dec. 18, 2002   (JP)  ............................. 2002-366794

(51) Int. Cl.
    *G01J 5/00*      (2006.01)
(52) U.S. Cl. ................. 73/866.5; 374/208; 324/207.25
(58) Field of Classification Search ............ 73/514.01, 73/514.16, 514.31, 514.32, 514.33, 514.34, 73/866.5; 374/208; 324/362, 207.25, 207.24, 324/173, 174, 208; 29/841, 855, 856, 854
    See application file for complete search history.

(56) References Cited

U.S. PATENT DOCUMENTS

| | | | | |
|---|---|---|---|---|
| 4,847,557 | A | * | 7/1989 | Saito et al. ............ 324/207.13 |
| 5,013,161 | A | * | 5/1991 | Zaragoza et al. ........... 374/208 |
| 5,133,606 | A | * | 7/1992 | Zaragoza et al. ........... 374/208 |
| 5,844,135 | A | | 12/1998 | Brammer et al. |
| 6,034,421 | A | | 3/2000 | Tokunaga |
| 6,336,902 | B1 | * | 1/2002 | Elson et al. ................ 600/505 |
| 6,357,909 | B1 | * | 3/2002 | Watanabe ................... 374/131 |
| 6,764,414 | B1 | * | 7/2004 | Kumamoto ................. 473/297 |

FOREIGN PATENT DOCUMENTS

| | | |
|---|---|---|
| CN | 86200819 | 2/1986 |
| JP | A-S63-45517 | 2/1988 |

* cited by examiner

*Primary Examiner*—Robert Raevis
(74) *Attorney, Agent, or Firm*—Posz Law Group, PLC

(57) ABSTRACT

A sensor includes a sensing portion for sensing physical quantity, a connector portion integrated with the sensing portion for electrically connecting the sensing portion and an outer circuit outside the sensor, a sensor casing for accommodating the sensing portion, and a connector casing for accommodating the connector portion. Both the sensor casing and the connector casing are made of thermoplastic resin. The sensor casing has a predetermined portion exposed outside from the connector casing. The other portion of the sensor casing is covered with the connector casing.

16 Claims, 2 Drawing Sheets

SENSOR HAVING RESIN MOLD CASING AND METHOD OF MANUFACTURING THE SAME

CROSS REFERENCE TO RELATED APPLICATION

This application is based on Japanese Patent Application No. 2002-366794 filed on Dec. 18, 2002, the disclosure of which is incorporated herein by reference.

FIELD OF THE INVENTION

The present invention relates to a sensor having a resin mold casing and a method of manufacturing the same. Specifically the resin mold casing accommodates a sensing portion and a connector portion, which are made of resin, respectively.

BACKGROUND OF THE INVENTION

A sensor having a resin mold casing according to a prior art is shown in FIG. 2. The sensor is disclosed in U.S. Pat. No. 6,034,421. The sensor includes a molded IC 1 having an IC chip as a sensing element and a casing 2 having a connector portion. The molded IC 1 is primarily molded with thermosetting resin such as epoxy resin. The molded IC 1 is accommodated in the casing 2 by being secondarily molded with thermoplastic resin. In other words, the molded IC 1 is composed of thermosetting resin, and the casing 2 is made of thermoplastic resin.

Thus, the IC chip as a sensing element is primarily molded with thermosetting resin, and this molded IC chip, i.e., the molded IC 1 is secondarily molded with thermoplastic resin. This construction is for preventing a wire and the like in the sensing element from breaking of wire and for securing mechanical strength of the casing 2.

In this sensor, since the molded IC 1 is composed of thermosetting resin and the casing 2 is made of thermoplastic resin, adhesiveness between the molded IC 1 and the casing 2 is low. In some cases, a clearance may be formed between the molded IC 1 and the casing 2. Therefore, in general, the casing 2 covers entirely the molded IC 1 so that the casing 2 prevents moisture from penetrating into the sensor.

However, since the sensing element, i.e., the IC chip is entirely covered with thermosetting resin as a primary resin mold and thermoplastic resin as a secondary resin mold, the sensing element is separated from the outside environment as a measurement object. In other words, a distance between the sensing element and the outside environment becomes large. Therefore, it is difficult to increase the response of the sensor and/or the sensitivity of the sensor, so that the degree of freedom in design and specification of the sensor becomes lower. Moreover, a potting material as a sealing is necessitated for sealing between the molded IC 1 and the casing 2, so that a manufacturing cost of the sensor is increased.

SUMMARY OF THE INVENTION

In view of the above problem, it is an object of the present invention to provide a sensor having a resin mold casing, which has no clearance in the resin mold casing and has high response and sensitivity of the sensor.

Moreover, it is another object of the present invention to provide a method of manufacturing a sensor having a resin mold casing.

A sensor includes a sensing portion for sensing physical quantity, a connector portion integrated with the sensing portion for electrically connecting the sensing portion and an outer circuit outside the sensor, a sensor casing for accommodating the sensing portion, and a connector casing for accommodating the connector portion. Both the sensor casing and the connector casing are made of thermoplastic resin. The sensor casing has a predetermined part exposed outside the sensor. The other part of the sensor casing is covered with the connector casing.

In the above sensor, since both the sensor casing and the connector casing are made of thermoplastic resin, both thermoplastic resins are molded together by heat in a secondary mold process so that no clearance is formed between the sensor casing and the connector casing. Thus, this construction can prevent moisture from penetrating into the sensor.

Moreover, the predetermined part of the sensor casing is exposed outside from the connector casing. Therefore, the sensing portion detects the physical quantity through this part of the sensor casing, so that the response and/or the sensitivity of the sensor can be improved.

Further, no potting material as a sealing is necessitated for sealing between the sensor casing and the connector casing, so that a manufacturing cost of the sensor is limited to increase.

Preferably, the sensing portion includes a sensing element and an electric circuit for processing a signal outputted from the sensing element, and the sensing element and the electric circuit are molded with thermoplastic resin composing the sensor casing.

Preferably, the sensor casing primarily molds the sensing portion, and the connector casing secondarily molds the sensor casing with the sensor portion except for a predetermined part of the sensor casing exposed outside the sensor.

Preferably, the sensor casing is made of a first thermoplastic resin, and the connector casing is made of a second thermoplastic resin. More preferably, physical properties of the first thermoplastic resin are different from those of the second thermoplastic resin, and the first thermoplastic resin provides high fluidity, and the second thermoplastic resin provides high mechanical strength.

A method of forming a sensor is provided. Here, the sensor includes a sensing portion for sensing a physical quantity, a connector portion for electrically connecting the sensing portion and an outer circuit outside the sensor, a sensor casing for accommodating the sensing portion, and a connector casing for accommodating the connector portion. The method includes the steps of molding the sensing portion with a first resin so that the sensor casing is formed, and molding the connector portion with a second resin so that the connector casing is formed. A predetermined part of the sensor casing is exposed outside from the connector casing, and the other part of the sensor casing is covered with the connector casing.

In the sensor manufactured by the above method, the predetermined part of the sensor casing is exposed outside from the connector casing. Therefore, the sensing portion detects the physical quantity through this part of the sensor casing, so that the response and/or the sensitivity of the sensor can be improved. Further, no potting material as a sealing is necessitated for sealing between the sensor casing and the connector casing, so that a manufacturing cost of the sensor is limited to increase.

Preferably, both the first and second resins are thermoplastic resin. Therefore, both thermoplastic resins are molded together by heat in a secondary mold process so that no clearance is formed between the sensor casing and the connector casing. Thus, this construction can prevent moisture from penetrating into the sensor.

Preferably, physical properties of the first resin are different from those of the second resin, and the first resin provides high fluidity, and the second resin provides high mechanical strength.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
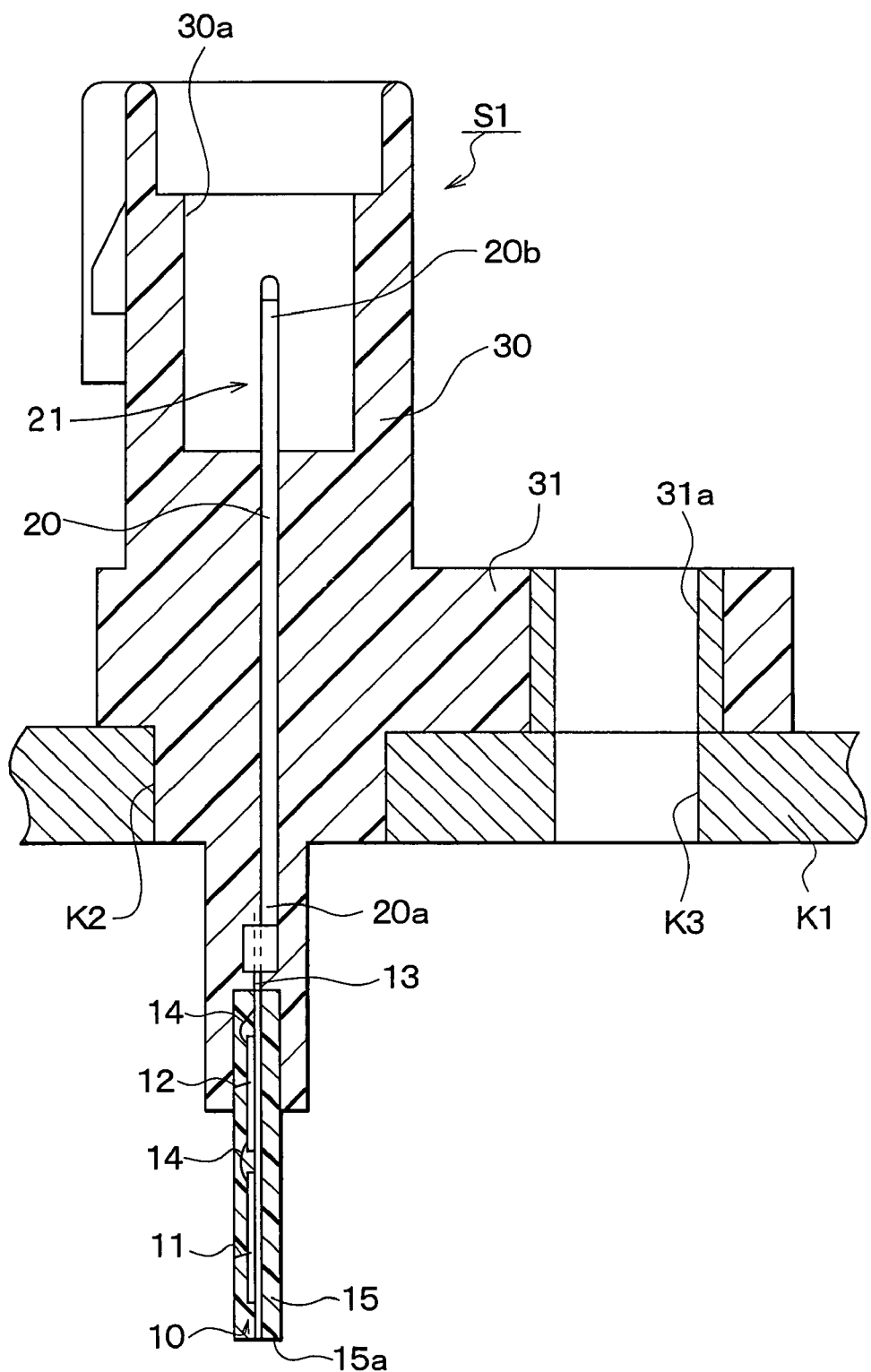
FIG. 1 is a schematic cross-sectional view showing a sensor according to a preferred embodiment of the present invention.
Figure 2:
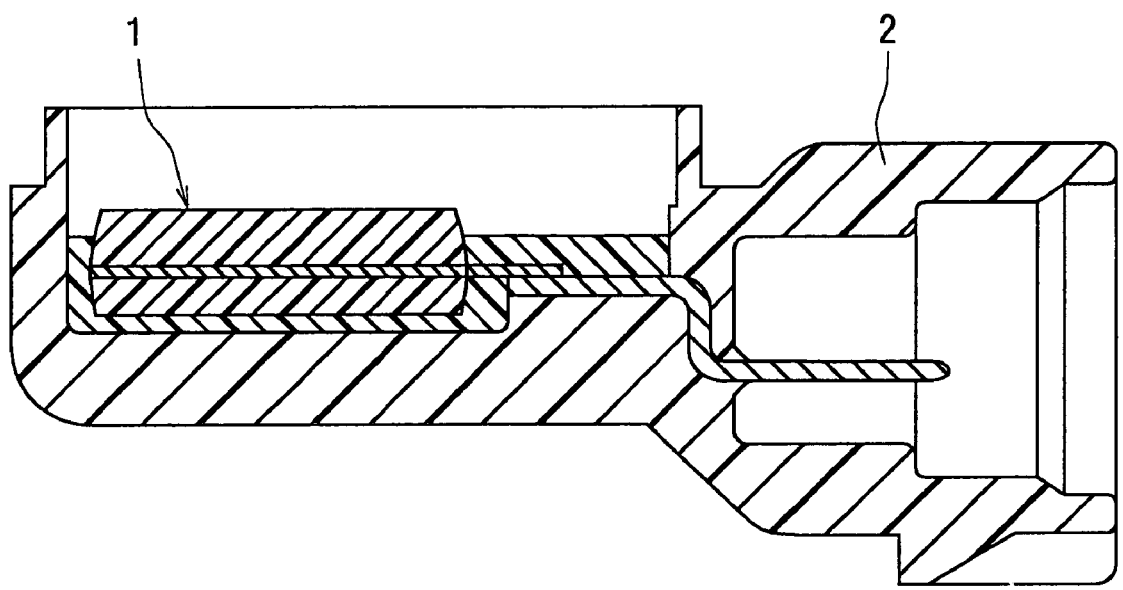
FIG. 2 is a schematic cross-sectional view showing a sensor according to the prior art.

A sensor S1 according to a preferred embodiment of the present invention is shown in FIG. 1. The sensor S1 senses a physical quantity such as temperature, magnetic field, acceleration and angular velocity.

The sensor S1 is mounted in an attachment K1 so that the sensor S1 senses temperature or magnetic field through the attachment K1, or acceleration or angular velocity applied to the attachment K1. The sensor S1 includes a sensing portion 10 and a connector portion 21. The sensing portion 10 includes a sensing element 11 for sensing the physical quantity and for outputting a sensor signal according to the sensed physical quantity, and an electric circuit 12 for processing the sensor signal from the sensing element 11.

The sensing element 11 is, for example, a thermistor in case of a temperature sensor, a magneto-resistance device in case of a magnetic sensor, or a sensor having a movable portion in case of an acceleration sensor and an angular velocity sensor. Here, the movable portion in the sensor moves in accordance with the acceleration or the angular velocity.

Besides, the electric circuit 12 for processing the sensor signal can be integrated into the sensing element 11. In this case, the sensing portion 10 may not have the electric circuit 12. In the sensing portion 10, the sensing element 11 and the electric circuit 12 are mounted on a lead frame 13 by bonding method and the like. The lead frame 13 is made of copper (Cu) or 42 alloy. The sensing element 11, the electric circuit 12, and the lead frame 13 are electrically connected together with a wire 14 such as gold (Au) or aluminum (Al)

Thus, the sensing element 11 and the electric circuit 12 are mounted on the lead frame 13 and connected together with the wire 14, and then they are covered with a sensor casing 15 so that they are sealed with thermoplastic resin as a resin mold. Accordingly, the sensing portion 10 having the sensing element 11 and the electric circuit 12 is accommodated in the sensor casing 15.

The connector portion 21 is integrally bonded and directly connects to the sensing portion 10. The connector portion 21 provides an electric connection between the sensing portion 10 and the outer circuit outside the sensor for communicating with an electric signal. The connector portion 21 includes a terminal 20, which is made of conductive material such as brass. One end of the terminal 20 on the sensing portion 10 side is a connection portion 20a, which directly connects to the sensing portion 10. The connection portion 20a of the terminal 20 and one end of the lead frame 13 that protrudes from the sensor casing 15 in the sensing portion 10 are connected together by soldering or welding.

Here, the connection portion 20a and the one end of the lead frame 13 are electrically and mechanically connected together by one point bonding of soldering or welding. Besides, the connection portion 20a and the one end of the lead frame 13 can be connected together by two points bonding of both cramping and soldering or both cramping and welding so that mechanical connection and electrical connection are provided by two bonding points, respectively.

Although the terminal 20 and the lead frame 13 are connected by the above bonding, the terminal 20 and the lead frame 13 can be integrated primarily so that they are composed of one part.

Thus, the sensing portion 10, the connector portion 21 and the sensor casing 15 are accommodated in a casing 30 as a connector casing. The casing 30 is made of thermoplastic resin. The sensor casing 15 is covered with the casing 30 except for a part of the sensing element 11, i.e., a part of the sensing element 11 is exposed from the casing 30. The casing 30 includes a flange 31 for mounting the sensor S1 on the attachment K1. As shown in FIG. 1, the casing 30 is inserted into a pocket K2 of the attachment K1. The flange 31 has, for example, a screw hole 31a so that the sensor S1 is screwed on the attachment K1 by a screw through the screw hole 31a of the flange 31 and a screw hole K3 of the attachment K1.

The other end 20b of the terminal 20, which is opposite to the connection portion 20a, protrudes inner space of an opening portion 30a formed in the casing 30. The other end 20b of the terminal 20 and the opening portion 30a are integrated together, so that a male connector is formed. The male connector is connectable to an outer circuit (not shown) and the like, which is outside the sensor.

Besides, the size, the shape, the connection direction, and the number of the flange 31 of the casing 30 may be changed in accordance with the type and the shape of the sensor S1. Moreover, the casing 30 can be used without the flange 31. In this case, for example, another part as an attachment fixes the casing 30 on the attachment K1. Further, an O-ring for sealing between the pocket K2 of the attachment K1 and the casing 30 can be inserted therebetween. Further, both an inner surface of the pocket K2 and an outer surface of the casing 30 corresponding to the inner surface of the pocket K2 can be screw-cut so that the casing 30 is directly screwed with the pocket K2.

In the sensor S1, a sensor signal outputted from the sensing element 11 is processed in the electric circuit 12. Then the sensor signal is outputted from the lead frame 13 to the outer circuit through the terminal 20.

The sensor S1 is manufactured as follows. For example, the sensing element 11 and the electric circuit 12 are mounted on the lead frame 13. Then, the sensing element 11 and the electric circuit 12 are electrically connected together by wire bonding method. And the connection portion 20a of the terminal 20 and one end of the lead frame 13 are connected together.

Thus, the sensing portion 10 and the connector portion 21 are integrated, and then they are primarily molded with the first thermoplastic resin so that the sensor casing 15 is formed. Successively, they are secondary molded with the second thermoplastic resin so that the casing 30 as a connector casing is formed. As a result, the sensor S1 is accomplished.

In this embodiment, both the sensor casing 15 and the casing 30 are made of thermoplastic resin. Therefore, the casing 30 is secondary molded with the second thermoplastic resin after the sensor casing 15 is primary molded with the first thermoplastic resin, so that first thermoplastic resin is melted and molded together with the second thermoplastic resin by heat in the secondary mold process. Thus, no clearance is formed between the sensor casing 15 and the casing 30.

Therefore, the outer circumference of the sensor casing 15 is not necessitated for being covered with the casing 30 entirely, so that a part of the sensor casing 15, i.e., an exposure portion 15a is exposed from the casing 30.

By forming the exposure portion 15a of the sensor casing 15, a boundary between the casing 30 and the sensor casing 15 is also exposed outside. However, both the first and second thermoplastic resins composing the casing 30 and the sensor casing 15 are molded and integrated so that no clearance is formed therebetween. Therefore, the boundary between the casing 30 and the sensor casing 15 also has no clearance. Thus, moisture tightness of the sensor S1 is secured so that no moisture penetrates into the sensor S1. Further, no potting material as a sealing is necessitated for sealing between the sensor casing 15 and the casing 30, so that a manufacturing cost of the sensor S1 is limited to increase.

Moreover, by forming the exposure portion 15a of the sensor casing 15, a distance between the sensing element 11 and the outer environment as a sensing object becomes small, so that the response and the sensitivity of the sensor S1 can be promoted.

In this embodiment, both the first and second thermoplastic resins composing the sensor casing 15 and the casing 30 are poly phenylene sulfide (i.e., PPS) and the like. Although the first thermoplastic resin composing the sensor casing 15 is almost the same as that of the casing 30, the physical properties of the first thermoplastic resin of the sensor casing 15 are different from that of the casing 30 by adjusting an additive in the thermoplastic resins. That is for the following reasons.

The first thermoplastic resin of the sensor casing 15 as the primary resin mold is required to have high fluidity so as to prevent the wire 14 and the like in the sensing portion 10 from breaking of wire. However, the second thermoplastic resin of the casing 30 as the secondary resin mold is required to have high mechanical strength because the casing 30 provides the outer circumference of the sensor S1.

For example, assuming the first and second thermoplastic resins are formed of PPS, the first thermoplastic resin has physical properties such that a linear coefficient of thermal expansion in a flowing direction is 2.1, a linear coefficient of thermal expansion in a direction perpendicular to the flowing direction is 2.0, and coefficient of viscosity (i.e., a rotational viscosity) in case of melting state is 49 Pa/sec. Moreover, the first thermoplastic resin may have another physical properties such that the linear coefficient of thermal expansion in the flowing direction is 5.5, the linear coefficient of thermal expansion in the direction perpendicular to the flowing direction is 5.6, and coefficient of viscosity in case of melting state is 46 Pa/sec.

On the other hand, the second thermoplastic resin has physical properties such that a linear coefficient of thermal expansion in a flowing direction is 1.7, a linear coefficient of thermal expansion in a direction perpendicular to the flowing direction is 6.2, and coefficient of viscosity in case of melting state is about a few hundred Pa/sec.

Assuming that the sensing portion 10 and the terminal 20 are molded with sensor casing 15 so that they are preliminarily integrated into one part, and then the one part is inserted into the casing 30 that is also preliminarily formed, a clearance is formed between the sensor casing 15 and the casing 30. That is the same as the sensor according to the prior art. Further, the one part cannot be inserted into the casing 30 when the casing 30 or the one part has an undercut, i.e., irregularity.

However, in this embodiment, the casing 30 as the connector casing is secondarily molded after the sensor casing 15 is primarily molded. Therefore, both the first and second thermoplastic resins are molded each other by heat in secondary mold process, so that no clearance is formed. Moreover, even when the sensor casing 15 and/or the casing 30 have an undercut, the sensor casing 15 can be molded, i.e., the sensor casing 15 can be accommodated in the casing 30.

Such changes and modifications are to be understood as being within the scope of the present invention as defined by the appended claims.

What is claimed is:

1. A sensor comprising:
   a sensing portion for sensing physical quantity;
   a connector portion integrated with the sensing portion for electrically connecting the sensing portion and an outer circuit outside the sensor;
   a sensor casing for accommodating the sensing portion; and
   a connector casing for accommodating the connector portion,
   wherein both the sensor casing and the connector casing are made of thermoplastic resin,
   wherein the sensor casing has a predetermined part exposed outside from the connector casing,
   wherein the other part of the sensor casing is covered with the connector casing,
   wherein the sensing portion is disposed on the predetermined part of the sensor casing,
   wherein the sensing portion includes a sensing element and an electric circuit for processing a signal outputted from the sensing element, and
   wherein the sensing element and the electric circuit are molded with thermoplastic resin composing the sensor casing.

2. A sensor comprising:
   a sensing portion for sensing physical quantity;
   a connector portion integrated with the sensing portion for electrically connecting the sensing portion and an outer circuit outside the sensor;
   a sensor casing for accommodating the sensing portion; and
   a connector casing for accommodating the connector portion,
   wherein both the sensor casing and the connector casing are made of thermoplastic resin,
   wherein the sensor casing has a predetermined part exposed outside from the connector casing,
   wherein the other part of the sensor casing is covered with the connector casing,
   wherein the sensing portion is disposed on the predetermined part of the sensor casing,
   wherein the sensor casing primarily molds the sensing portion, and
   wherein the connector casing secondarily molds the sensor casing except for a predetermined part of the sensor casing exposed outside of the connected casing.

3. The sensor according to claim 2,
wherein the sensor casing is made of a first thermoplastic resin, and
wherein the connector casing is made of a second thermoplastic resin.

4. The sensor according to claim 3,
wherein physical properties of the first thermoplastic resin are different from those of the second resin, and
wherein the first thermoplastic resin provides high fluidity, and the second thermoplastic resin provides high mechanical strength.

5. The sensor according to claim 3,
wherein the first thermoplastic resin has physical properties such that the linear coefficient of thermal expansion in a flowing direction is between 2.1 and 5.5, the linear coefficient of thermal expansion in a direction perpendicular to the flowing direction is between 2.0 and 5.6, and the coefficient of viscosity in a case of a melting state is between 46 Pa/second and 49 Pa/second.

6. The sensor according to claim 5,
wherein the second thermoplastic resin has physical properties such that the linear coefficient of thermal expansion in the flowing direction is 1.7, the linear coefficient of thermal expansion in the direction perpendicular to the flowing direction is 6.2, and the coefficient of viscosity in a case of a melting state is between 100 Pa/second and 1000 Pa/second.

7. The sensor according to claim 3,
wherein both the first and second thermoplastic resins are poly phenylene sulfide,
wherein the first thermoplastic resin includes an additive so that the first thermoplastic resin provides high fluidity, and
wherein the second thermoplastic resin includes another additive so that the second thermoplastic resin provides high mechanical strength.

8. A sensor comprising:
a sensing portion for sensing physical quantity;
a connector portion integrated with the sensing portion for electrically connecting the sensing portion and an outer circuit outside the sensor;
a sensor casing for accommodating the sensing portion; and
a connector casing for accommodating the connector portion,
wherein both the sensor casing and the connector casing are made of thermoplastic resin,
wherein the sensor casing has a predetermined part exposed outside from the connector casing,
wherein the other part of the sensor casing is covered with the connector casing,
wherein the sensing portion includes a sensing element and an electric circuit for processing a signal outputted from the sensing element, and
wherein the sensing element and the electric circuit are molded with thermoplastic resin composing the sensor casing.

9. A sensor comprising:
a sensing portion for sensing physical quantity;
a connector portion integrated with the sensing portion for electrically connecting the sensing portion and an outer circuit outside the sensor;
a sensor casing for accommodating the sensing portion; and
a connector casing for accommodating the connector portion,
wherein both the sensor casing and the connector casing are made of thermoplastic resin,
wherein the sensor casing has a predetermined part exposed outside from the connector casing,
wherein the other part of the sensor casing is covered with the connector casing,
wherein the sensor casing primarily molds the sensing portion, and
wherein the connector casing secondarily molds the sensor casing except for a predetermined part of the sensor casing exposed outside from the connector casing.

10. The sensor according to claim 9,
wherein the sensor casing is made of a first thermoplastic resin, and
wherein the connector casing is made of a second thermoplastic resin.

11. The sensor according to claim 10,
wherein physical properties of the first thermoplastic resin are different from those of the second resin, and
wherein the first thermoplastic resin provides high fluidity, and the second thermoplastic resin provides high mechanical strength.

12. The sensor according to claim 10,
wherein the first thermoplastic resin has physical properties such that linear coefficient of thermal expansion in a flowing direction is between 2.1 and 5.5, linear coefficient of thermal expansion in a direction perpendicular to the flowing direction is between 2.0 and 5.6, and coefficient of viscosity in case of melting state is between 462 a/sec. and 49 Pa/sec.

13. The sensor according to claim 12,
wherein the second thermoplastic resin has physical properties such that the linear coefficient of thermal expansion in the flowing direction is 1.7, the linear coefficient of thermal expansion in the direction perpendicular to the flowing direction is 6.2 and the coefficient of viscosity in case of melting state is between 100 Pa/sec. and 1000 Pa/sec.

14. The sensor according to claim 10,
wherein both the first and second thermoplastic resins are poly phenylene sulfide,
wherein the first thermoplastic resin includes an additive so that the first thermoplastic resin provides high fluidity, and
wherein the second thermoplastic resin includes another additive so that the second thermoplastic resin provides high mechanical strength.

15. A method of forming a sensor, which includes a sensing portion for sensing physical quantity, a connector portion for electrically connecting the sensing portion and an outer circuit outside the sensor, a sensor casing for accommodating the sensing portion, and a connector casing for accommodating the connector portion, the method comprising the steps of:
molding the sensing portion with a first resin so that the sensor casing is formed; and
molding the connector portion with a second resin so that the connector casing is formed,
wherein a predetermined part of the sensor casing is exposed outside from the connector casing, and the other portion of the sensor casing is covered with the connector casing,
wherein the sensing portion is disposed on the predetermined part of the sensor casing,
wherein both the first and second resins are thermoplastic resin, wherein the first resins has physical properties such that linear coefficient of thermal expansion in a flowing direction is between 2.2 and 5.5, linear coefficient of thermal expansion in a direction perpendicular to the flowing direction is between 2.0 and 5.6, and coefficient of viscosity in case of melting state is between 46 Pa/sec. and 49 Pa/sec, and wherein the second resin has physical properties such that the linear coefficient of thermal expansion in the flowing direction is 1.7, the linear coefficient of thermal expansion in the direction perpendicular to the flowing direction is 6.2, and the coefficient of viscosity in case of melting state is between 100 Pa/sec. and 1000 Pa/sec.

16. A method of forming a sensor, which includes a sensing portion for sensing physical quantity, a connector portion for electrically connecting the sensing portion and an outer circuit outside the sensor, a sensor casing for accommodating the sensing portion and a connector casing for accommodating the connector portion, the method comprising the steps of:

molding the sensing portion with a first resin so that the sensor casing is formed; and molding the connector portion with a second resin so that the connector casing is formed, wherein a predetermined part of the sensor casing is exposed outside from the connector casing, and the other portion of the sensor casing is covered with the connector casing, wherein physical properties of the first resin are different from those of the second resin, wherein the first resin provides high fluidity, and the second resin provides high mechanical strength, and wherein both the first and second resins are thermoplastic resin.

* * * * *